United States Patent [19]

Asplund

[11] 4,179,225
[45] Dec. 18, 1979

[54] QUICKLY DETACHABLE COUPLING

[75] Inventor: Alf A. Asplund, Kristineham, Sweden

[73] Assignee: Agergards Maskiner AB, Karlstad, Sweden

[21] Appl. No.: 929,070

[22] Filed: Jul. 28, 1978

Related U.S. Application Data

[63] Continuation-in-part of Ser. No. 762,214, Jan. 24, 1977.

[51] Int. Cl.² ............................................... B25G 3/18
[52] U.S. Cl. ..................................... 403/322; 403/324; 180/14 R; 172/272
[58] Field of Search ................. 403/322, 324; 180/11, 180/14 R; 214/131 A, 145 A; 172/272, 274; 192/34

[56] References Cited

U.S. PATENT DOCUMENTS

| | | | |
|---|---|---|---|
| 735,060 | 8/1903 | Boussemaere | 403/324 |
| 1,223,833 | 4/1917 | Robbins | 403/324 X |
| 1,955,969 | 4/1934 | Marzolf | 403/324 |
| 2,474,722 | 6/1949 | Blume | 403/322 X |
| 2,794,633 | 6/1957 | Delany | 403/322 X |
| 3,478,906 | 11/1969 | Smith | 403/324 X |
| 3,719,244 | 3/1973 | Miller et al. | 180/14 R |
| 3,955,832 | 5/1976 | Kalmanson | 403/322 X |

Primary Examiner—Wayne L. Shedd
Attorney, Agent, or Firm—Pollock, Vande Sande & Priddy

[57] ABSTRACT

The invention relates to a coupling for working vehicles, such as tractors, which coupling comprises on the working vehicle two fixedly connected members, two locking bars and two levers for cooperation with two coupling members on the work attachment. The two fixedly connected members are joined by means of a pipe arranged between their facing sides, in which pipe the two locking bars are slidably mounted for movement through orifices in said members to positions inside and outside of the outwardly facing sides of the latter. The locking bars work within the free surfaces of the members defined by their edge surface. The coupling members have an inner wedge-shaped cavity corresponding to the outer wedge shape of the fixedly connected members, and have orifices in their walls having the same dimensional relationship to their inner wedge-shaped cavities as the locking bars have to the outer wedge shape of the fixedly connected members.

3 Claims, 3 Drawing Figures

QUICKLY DETACHABLE COUPLING

STATEMENT OF RELATED APPLICATION

This is a continuation-in-part of U.S. patent application Ser. No. 762,214, filed Jan. 24, 1977.

BACKGROUND OF THE INVENTION

The present invention relates to a coupling for work attachments, especially for working vehicles, said coupling on the working vehicle comprising two mutually fixedly connected wedge-shaped members, two locking bars and two levers for cooperation with corresponding coupling means on the work attachment.

In working vehicles to which various work attachments, e.g., ploughs, gripper forks, digging and loading buckets, etc., are to be coupled, it is important that the coupling between the working vehicle and the attachment be resistant to great meachnical stresses, so that deformation of the attachment does not prevent its release from and recoupling to the working vehicle.

SUMMARY OF THE INVENTION

According to the present invention, these requirements are partly met by means of an arrangement on the working vehicle comprising two wedge-shaped members which are fixedly joined to each other by means of a pipe arranged between their facing sides, in which pipe two locking bars can, by means of two levers, be moved inside and outside of the sides of the members facing away from the pipe, and partly by means of two coupling members arranged on the attachment, said coupling members having wedge-shaped interior cavities complementary to the wedge shaped, members, the side surfaces of said coupling members being provided with orifices for cooperation with the locking bars when the latter project beyond the free sides of the wedge-shaped members.

BRIEF INTRODUCTION TO THE DRAWINGS

The invention is illustrated by the accompanying drawings, in which

DESCRIPTION OF A PREFERRED EMBODIMENT

Figure 1:
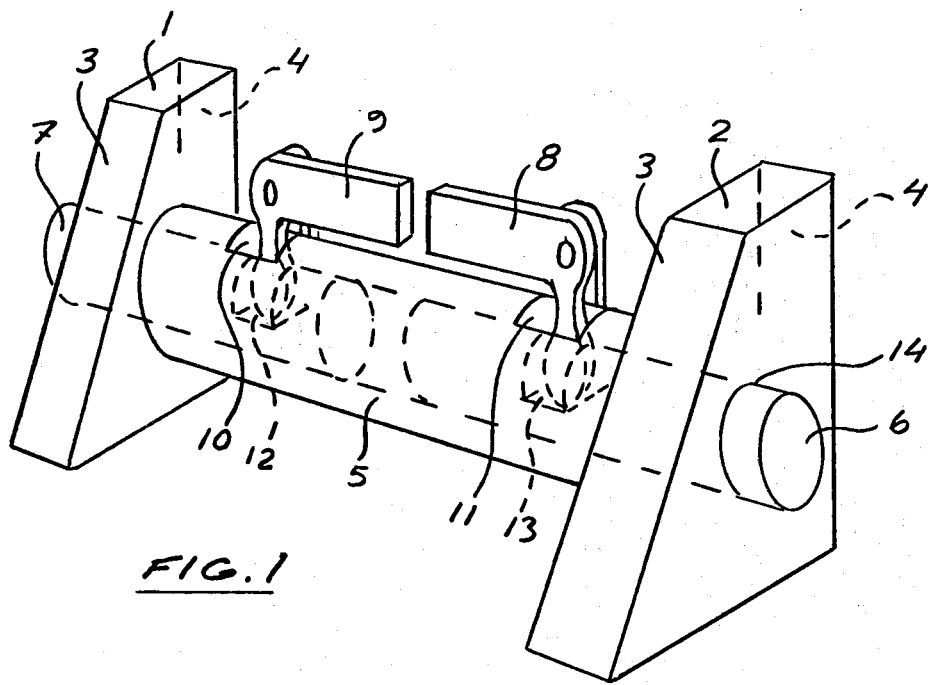
FIG. 1 is a perspective view of the coupling portion of a working vehicle.

FIG. 1 shows a coupling arrangement on the working vehicle, including two members 1, 2, each having two converging sides 3, 4 forming a wedge shape. Members 1, 2 are fixedly joined by means of a pipe 5 arranged between their facing sides in which pipe two locking bars 6 and 7 are slidably mounted. Two levers 8, 9 are pivotably arranged on pipe 5. Through openings 10, 11 in pipe 5, levers 8, 9 can engage respective recesses 12, 13 in locking bars 6, 7 so that the latter can be slidably moved inside of and outside of the outwardly facing sides of the wedge-shaped members.

Figure 3:
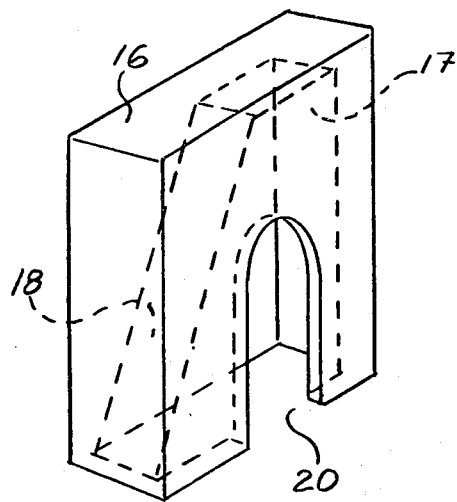
FIGS. 2 and 3 show in perspective the coupling portions of an attachment to be coupled to said vehicle.
Figure 2:
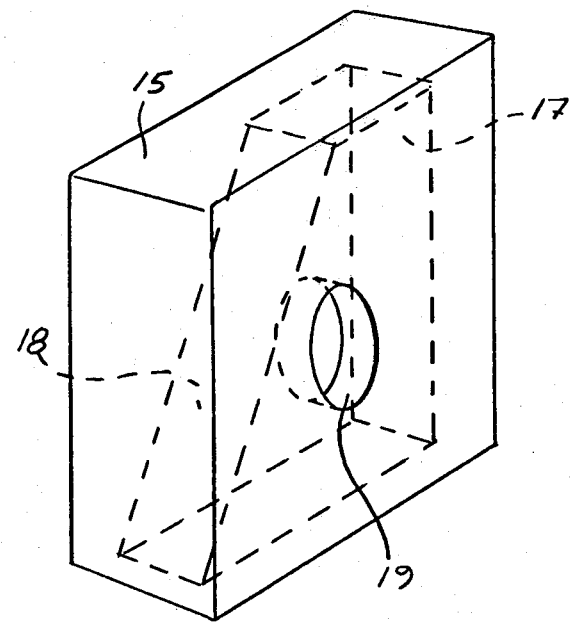

FIGS. 2 and 3 show two coupling members 15, 16 whose interior shapes are substantially complementary to the outer shapes of members 1, 2, the inner wedge shape of coupling members 15, 16 formed by converging sides 17, 18 corresponding precisely to the outer wedge shape of members 1, 2 formed by converging sides 3, 4. An orifice 19 is provided in one side wall of each of coupling members 15, 16. The position of orifices 19 has the same dimensional relationship to the inner wedge shape of coupling members 15, 16 as locking bars 6, 7 have in relation to the outer wedge shape of members 1, 2. Recesses 20 which are at least as large as the outer dimension of the pipe 5 connecting members 1, 2 are arranged in the walls of the coupling means opposite to those in which holes 19 are located.

A coupling according to the invention is effected by inserting the coupling arrangement on the working vehicle shown in FIG. 1 under coupling members 15, 16 on the attachment as shown in FIGS. 2 and 3, whereafter members 1, 2 are raised and, because of their wedge shape, easily fitted into coupling members 15, 16. When members 1, 2 are completely inserted, their outer wedge shape cooperates with the interior wedge shape of the coupling members, so that a play-free mutual connection is achieved. In this position, locking bars 6, 7 can be slidingly moved by means of levers 8, 9, so that they project out of members 1, 2 and into holes 19 in the outer sides of coupling members 15, 16.

The connection is strong, and by means of the locking bars 6, 7 working within the free side surfaces of members 1, 2 defined by the edge surfaces, the dimensional relationships for the locking bar positions in coupling members 15, 16 remain unaltered even if the work attachment is subjected to deformation.

What is claimed is:

1. Means for coupling a working vehicle to a work attachment to be pulled by said vehicle, comprising
   (a) a first assembly comprising
      (i) two wedge shaped members each having a transverse orifice in its central portion;
      (ii) an at least partly hollow pipe member extending into said transverse orifice of each of said wedge members to provide a fixed connection therebetween;
      (iii) two locking bars mounted for sliding movement in opposite ends of said hollow pipe member, each said locking bar having a recess therein;
      (iv) two lever means pivotally mounted on said pipe member and having depending portions each engaging a said recess in a said locking bar, whereby said locking bars are slidable within said hollow pipe member; and
   (b) a second assembly comprising
      (i) a set of two substantially parallel members each having an interior cavity congruent with that of each of said wedge-shaped members, for receiving said wedge-shaped members during coupling;
      (ii) an orifice in the wall of each of said last-mentioned members facing away from the other of said last-mentioned members, said orifices being in substantial alignment with said locking bars, whereby upon sliding movement of said locking bars said ends thereof are received in said orifices, for coupling said working vehicle to said work attachment.

2. Means according to claim 1, wherein said locking bars are slidable between a coupled position in which their outer ends engage said orifices in said second assembly members, and an uncoupled position in which said locking bars are retracted to a position in which their outer ends are out of engagement with said orifices.

3. Means according to claim 1, wherein said second assembly members have slotted recesses in their facing walls, for receiving said hollow pipe member during coupling of said first and second assemblies.

* * * * *